United States Patent
Ott et al.

(10) Patent No.: US 9,208,188 B2
(45) Date of Patent: Dec. 8, 2015

(54) TENANT MANAGEMENT OF A HOSTED MULTI-TENANT APPLICATION

(75) Inventors: Michael James Ott, Redmond, WA (US); David Robert Shutt, Seattle, WA (US); Hao Sun, Sammamish, WA (US); Ramesh T. Bangalore, Redmond, WA (US); Douglas William Wood, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1188 days.

(21) Appl. No.: 12/371,935

(22) Filed: Feb. 17, 2009

(65) Prior Publication Data

US 2010/0211548 A1   Aug. 19, 2010

(51) Int. Cl.
G06F 17/30 (2006.01)
G06F 11/14 (2006.01)

(52) U.S. Cl.
CPC .... G06F 17/30348 (2013.01); G06F 17/30575 (2013.01); *G06F 11/1451* (2013.01); *G06F 2201/80* (2013.01); *G06F 2201/84* (2013.01)

(58) Field of Classification Search
CPC .................. G06F 17/30348; G06F 17/30575
USPC .......................................... 707/639–641, 655
See application file for complete search history.

(56) References Cited

U.S. PATENT DOCUMENTS

| 7,366,858 | B2 | 4/2008 | Berkowitz et al. | |
|---|---|---|---|---|
| 7,836,029 | B2* | 11/2010 | Shoens | 707/695 |
| 7,840,673 | B1* | 11/2010 | O'Crowley | 709/226 |
| 7,917,607 | B2* | 3/2011 | Becker et al. | 709/222 |
| 2002/0087694 | A1* | 7/2002 | Daoud et al. | 709/226 |
| 2005/0049937 | A1 | 3/2005 | Sanders | |
| 2005/0050142 | A1* | 3/2005 | Capone et al. | 709/204 |
| 2005/0188345 | A1 | 8/2005 | Chang et al. | |
| 2006/0190581 | A1* | 8/2006 | Hagale et al. | 709/223 |
| 2006/0247944 | A1 | 11/2006 | Calusinski et al. | |
| 2007/0088741 | A1 | 4/2007 | Brooks et al. | |
| 2007/0130137 | A1 | 6/2007 | Oliver et al. | |
| 2007/0150856 | A1* | 6/2007 | Warner et al. | 717/106 |
| 2007/0162537 | A1 | 7/2007 | Juncker | |
| 2007/0162969 | A1* | 7/2007 | Becker | 726/16 |
| 2007/0220065 | A1* | 9/2007 | Coyle et al. | 707/203 |
| 2008/0040335 | A1 | 2/2008 | Gatti et al. | |
| 2008/0086479 | A1 | 4/2008 | Fry et al. | |
| 2008/0201701 | A1* | 8/2008 | Hofhansl et al. | 717/168 |
| 2008/0209503 | A1* | 8/2008 | Hess et al. | 726/1 |

(Continued)

OTHER PUBLICATIONS

"Multitenant Platforms", retrieved at << http://www.salesforce.com/uk/platform/why-ondemand/muti-tenant-platforms/ >>, Dec. 8, 2008, p. 1.

(Continued)

*Primary Examiner* — Grace Park
(74) *Attorney, Agent, or Firm* — Damon Rieth; Danielle Johnston-Holmes; Micky Minhas

(57) ABSTRACT

A hosted multi-tenant application is provided that permits a tenant to self-manage aspects of the operation of the application. A tenant may be permitted to upgrade the multi-tenant application on-demand or according to a schedule, to place the multi-tenant application into a read-only mode of operation, to create a shadow copy of their unshared organization database, to merge changes to a shadow copy into a master version of the unshared organization database, to create and revert to snapshots of an unshared organization database, and to perform other functions. A computing architecture that utilizes site-wide server computers and scale groups may be utilized to implement this functionality.

19 Claims, 12 Drawing Sheets

(56) References Cited

U.S. PATENT DOCUMENTS

2008/0222373 A1    9/2008  Garimella
2010/0138440 A1*  6/2010  Driesen .......................... 707/765

OTHER PUBLICATIONS

"A2ZApplications.Com India's First Multi-Tenant, Multi-Utility Software-As-A-Service Platform", retrieved at << http://corporate.a2zapplications.com/en/resources/DataSheet_a2zapplications.pdf >>, pp. 3.

"Building Distributed Applications: Architecture Strategies for Catching the Long Tail", retrieved at << http://msdn2.microsoft.com/en-us/library/aa479069(printer).aspx >>, Apr. 2006, pp. 21.

"A2ZApplications.Com India's First Multi-Tenant, Multi-Utility Software-As-A-Service Platform", downloaded Dec. 8, 2008 from http://corporate.a2zapplications.com/en/resources/DataSheet_a2zapplications.pdf, pp. 3.

* cited by examiner

TENANT MANAGEMENT OF A HOSTED MULTI-TENANT APPLICATION

BACKGROUND

A hosted application is a software application where the software resides on servers that are accessed through a wide-area network, such as the Internet, rather than more traditional on-premise software that is installed on a local server computer or on individual client computers. Hosted applications may also be known as Internet applications, application service providers ("ASPs"), World Wide Web ("Web")-based applications, or on-line applications. Hosted applications are commonly utilized concurrently by multiple customers called "tenants." Such applications are referred to herein as hosted multi-tenant applications.

As software is being more frequently offered as a service, such as through hosted multi-tenant applications for instance, customers are losing some of the flexibility that comes with on-premise software. For instance, when adopting a new version of on-premise software, customers often take actions such as training or testing with other integrated solutions. Even without a version upgrade, customers often have the need to make substantial changes to the software, such as importing a large amount of data, and would prefer to be able to practice these operations prior to executing them on production data. As a result, customers often create temporary "production-like" versions of their systems to accomplish these scenarios without affecting the day-to-day use of their production system. However, due to significant architectural limitations in current hosted applications, ASPs cannot typically provide this type of flexibility to the tenants of a hosted multi-tenant application.

It is with respect to these considerations and others that the disclosure made herein is provided.

SUMMARY

Technologies are described herein for tenant management of a hosted multi-tenant application. Through the utilization of aspects presented herein, a hosted application can be provided in a manner that permits a tenant to self-manage aspects of the operation of the application. For instance, through an implementation of the embodiments presented herein, a tenant can upgrade the multi-tenant application on-demand or according to a schedule, place the hosted multi-tenant application into a read-only mode of operation, create and utilize a shadow copy of their tenant database, merge changes to a shadow copy into a master version of their tenant database, create and revert to snapshots of their database, and perform other functions.

According to one aspect presented herein, a hosted application is provided that supports concurrent use by multiple tenants. The hosted application may be a hosted business application, such as a customer relationship management ("CRM") application, or another type of business application. The server computers ("servers") utilized to provide the hosted application are organized into site-wide servers and scale groups. The site-wide server computers perform site-wide functions for the hosted application, including processing sign-in and sign-up requests, site-wide messaging, help functions, and domain name services ("DNS") for mapping each tenant to an assigned scale group. The site-wide server computers may also provide facilities for site configuration, billing, customer support, and for performing other functions.

The scale groups represent logical groupings of servers. Each scale group includes a shared middle-tier and a database-tier for supporting tenants assigned thereto. When a new tenant is provisioned, the tenant is assigned to a scale group and a database server in the assigned scale group creates a private, unshared organization database for the tenant. An association between the tenant and the scale group is also created in a shared configuration database. When a request is received from a tenant to access the hosted application, the shared configuration database is consulted to locate the scale group hosting the private, unshared organization database for the tenant. Once the appropriate scale group has been located, the request is redirected to the middle-tier in the appropriate scale group for processing.

According to one embodiment presented herein, a tenant may be permitted to upgrade to a new version of the hosted multi-tenant application on-demand. An upgrade to the hosted application is first deployed to the site-wide server computers. Once the site-wide server computers have been upgraded, one or more upgraded scale groups are deployed. A notification may then be provided to tenants of the hosted multi-tenant application that an upgrade is available. If a request is received from a tenant to upgrade, the tenant's unshared organization database is placed into a read-only mode of operation. The tenant's unshared organization database is then migrated to an upgraded scale group. The unshared organization database is upgraded and enabled for use by the tenant at the upgraded scale group. For instance, the shared configuration database may be updated to reflect the tenant's new scale group.

According to other implementations, a tenant can also create and utilize a shadow copy of their tenant data, including their unshared organization database. The shadow copy is a new tenant within the CRM application that includes the tenant's unshared organization database. The shadow copy may be upgraded to a new version of the CRM application in the manner described above. Additionally, data is recorded indicating that the shadow copy was created from a "master" tenant so that changes to the shadow copy can later be merged into the tenant's original unshared organization database if desired.

According to other embodiments, a tenant can also place their unshared organization database into a read-only mode of operation. In the read-only mode of operation, no changes can be made to the database. In one embodiment, the read-only mode of operation is implemented by revoking privileges from user roles executing within the tenant, thereby restricting the ability of the user roles to modify the contents of the unshared organization database. According to other embodiments, other mechanisms are utilized to place the unshared organization database into a read-only mode of operation.

According to other embodiments, a tenant may also be permitted to create one or more snapshots of their unshared organization database. Functionality may also be provided for allowing the tenant to revert their unshared organization database to a previously created snapshot.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore,

DETAILED DESCRIPTION

Figure 1:
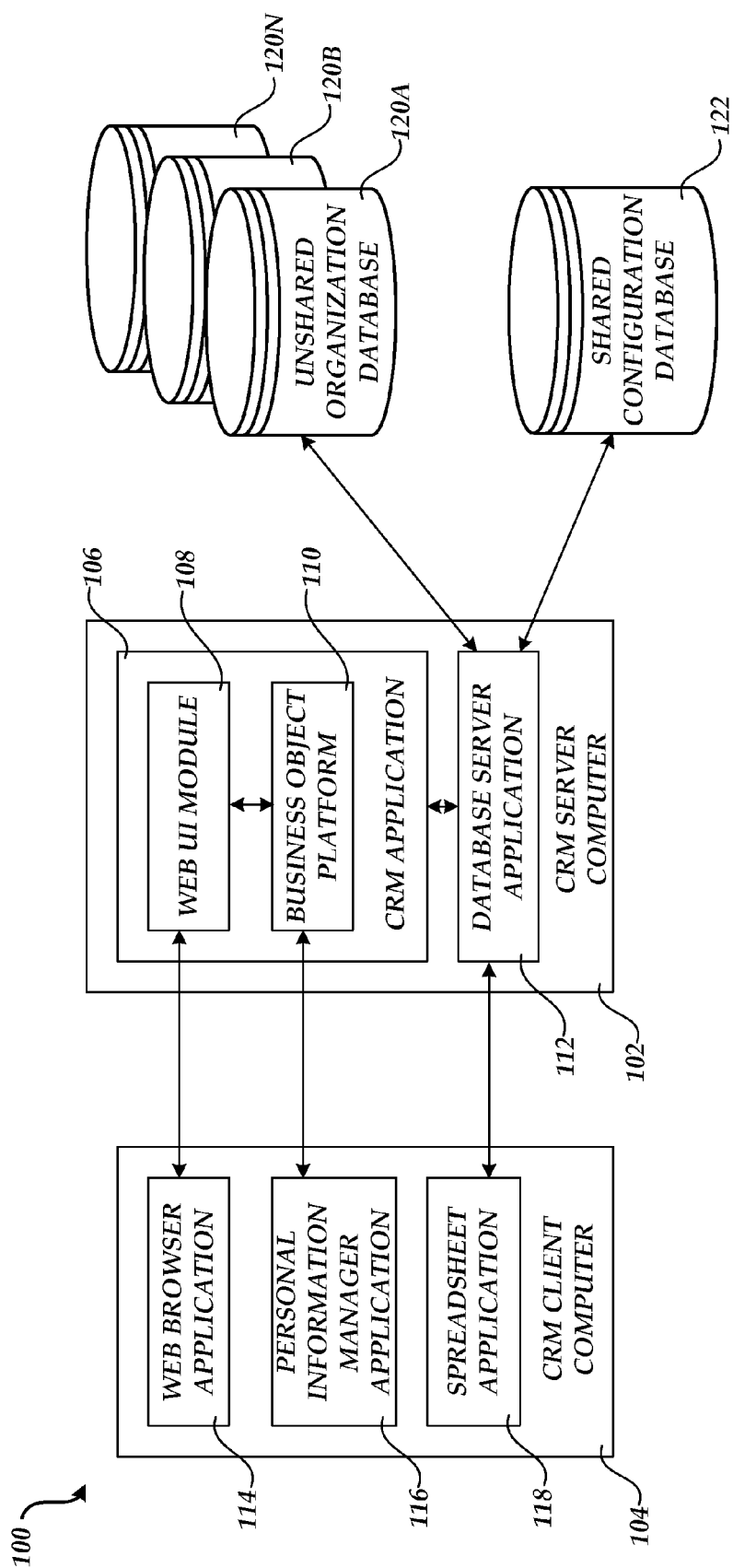
FIGS. 1-2C are software architecture diagrams illustrating aspects of a software architecture utilized in several of the embodiments presented herein.

The following detailed description is directed to technologies for enabling tenant management of aspects of the operation of a hosted multi-tenant application. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing tenant management of features within a hosted multi-tenant application program will be described. In particular, FIG. 1 is a network and software architecture diagram that shows one illustrative operating environment for the embodiments presented herein along with aspects of several software components presented herein.

As discussed briefly above, the illustrative computing system 100 shown in FIG. 1 provides a hosted multi-tenant application program. In the embodiments presented herein, the application program is a program for providing CRM functionality. CRM applications allow businesses to manage the relationships with their customers, including the capture, storage, and analysis of customer information. It should be appreciated, however, that any type of hosted application may be implemented utilizing the technologies presented herein, including other types of hosted business applications.

Through the use of the system 100 shown in FIG. 1, multiple organizations, referred to herein as "tenants," may concurrently utilize the computing resources provided by the system 100. The illustrative computing system 100 shown in FIG. 1 includes a CRM server computer 102. The CRM server computer 102 executes a CRM application 106 and maintains one or more associated databases, described more fully herein. The CRM application 106 provides functionality for managing relationships with business customers, including the capture, storage, and analysis of customer information.

The CRM functionality provided by the CRM application 106 may be accessed through the use of a Web browser application 114 executing on a client computer, such as the CRM client computer 104. In this regard, the CRM application 106 includes a Web user interface ("UI") module 108 for exposing a Web-compatible network interface. In this manner, the CRM client computer 104 can be utilized to access functionality provided by the CRM application 106 for creating and viewing customer information, for communicating with customers via the CRM application 106, and for performing other CRM-related functions. The CRM client computer 104 might also include a spreadsheet application 118.

According to embodiments presented herein, the CRM application 106 also includes a business object platform 110. The business object platform 110 is a software platform for executing software components that perform the actual business processing for the CRM application 106. The business object platform 110 operates in conjunction with the Web UI module 108 to make this functionality accessible through a Web interface. Aspects of the functionality provided by the CRM application 106 may also be accessed through a plug-in to a personal information manager ("PIM") application 116. In one embodiment, a plug-in executing within the PIM application 116 communicates directly with the business object platform 110 to enable this functionality.

As shown in FIG. 1, the CRM application 106 operates in conjunction with a database server application 112, which also executes on the CRM server computer 102. The database server application 112 provides functionality for creating, maintaining, accessing, and updating one or more databases. According to embodiments, the database server application 112 comprises the SQL SERVER database server application from MICROSOFT CORPORATION of Redmond, Wash. It should be appreciated that any suitable database server application may be utilized in the manner described herein.

Through the use of the database server application 112, the CRM application 106 is operative to maintain several databases. In particular, the CRM application 106 maintains a shared configuration database 122 (also referred to herein as a "site-wide configuration database"). As will be described in greater detail herein, the CRM application 106 utilizes the shared configuration database 122 to store global system-level information and data that is shared by the tenants. For instance, according to embodiments, the shared configuration database 122 may be utilized to store information about tenants, such as their name and contact information, information about which tenant particular users are members of, and information mapping authentication data to a specific user. In one implementation presented herein, the shared configuration database 122 is also utilized to store data defining a scale group to which each tenant hosted by the CRM application 106 has been assigned. Additional details regarding the use of the data in this regard will be provided below.

The CRM application 106 also maintains the unshared organization databases 120A-120N. The unshared organization databases 120A-120N are utilized by the CRM application 106 to store private, unshared data for the tenants. Each unshared organization database 120A-120N is associated with a particular tenant and its contents are inaccessible to the other tenants. According to aspects, each unshared organization database 120A-120N is utilized to store private tenant data for the associated tenant. Each unshared organization database 120A-120N may also be utilized to store customizations to the CRM application 106 made by the associated tenant including, but not limited to, customized entities, attributes, relationships, forms, views, code-level extensibility plug-ins, and any other type of customization to the CRM application 106. Additional details regarding the creation and use of the shared configuration database 122 and the unshared organization databases 120A-120N will be provided below. It should be appreciated that other types of databases and database schema may be utilized to store the global system-level information and the tenant data according to embodiments.

Figure 2A:
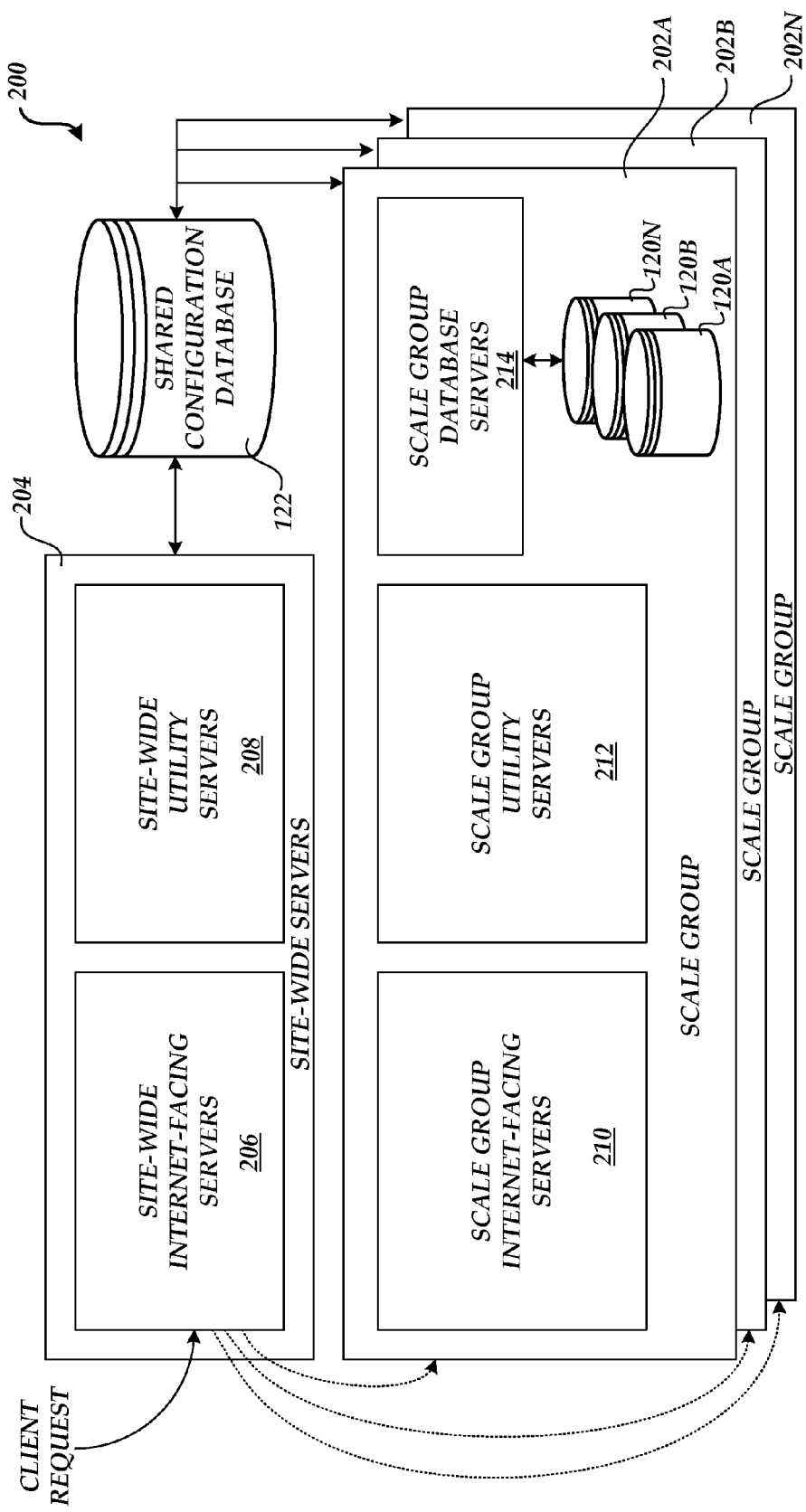

Referring now to FIG. 2A, another embodiment presented herein for providing a hosted multi-tenant application that utilizes per-tenant unshared private databases will be described. In this embodiment, a system 200 is provided wherein the servers that provide the CRM functionality described herein are organized into the scale groups 202A-202N. The scale groups 202A-202N are logical groupings of servers, each of which has one or more tenants assigned thereto.

In one implementation, each scale group 202A-202N includes a shared middle-tier and a database-tier for supporting the tenants assigned to the scale group. The scale group Internet-facing servers 210 implement the middle-tier by executing the CRM application 106, while the scale group database servers 214 implement the database-tier by executing the database server application 112. One or more scale group utility servers 212 are also provided within each scale group 202A-202N for performing utility functions, such as reporting services, load balancing, provisioning, configuration, statistics, and others. Each scale group may also include its own configuration database that is private to the scale group but shared amongst all of the tenants of the scale group. As will be described in greater detail below, the servers in each of the scale group 202A-202N may be assigned to one or more roles for performing these functions.

When a new tenant is provisioned within the system 200, the tenant is assigned to one of the scale groups 202A-202N. At this time, one of the scale group database servers 214 in the assigned scale group creates a private, unshared database 120 for the tenant. In this manner, the private, unshared database 120 for the new tenant is created and stored in the assigned scale group 202. An association, or mapping, between the tenant and the assigned scale group 202 is also created in the shared configuration database 122.

As shown in FIG. 2A, the system 200 also includes one or more site-wide servers 204. In particular, one or more site-wide Internet-facing servers 206 are provided along with one or more site-wide utility servers 208. The site-wide Internet-facing servers 206 perform site-wide functions for the system 200, including processing sign-in and sign-up requests, site-wide messaging, help functions, and DNS functions for mapping each tenant to the appropriate scale group 202A-202N. The site-wide utility servers 208 provide facilities for site configuration, billing, customer support, and others. As will also be discussed in greater detail below, the site-wide servers 204 may also be assigned to one or more roles for performing these functions.

As will be described in greater detail below, network client requests to access the hosted application are received at the site-wide Internet-facing servers 206. In response to receiving such requests, the shared configuration database 122 is consulted to locate the scale group 202A-202N hosting the private, unshared database 120 for the tenant making the request. Once the appropriate scale group 202A-202N has been located, the incoming request is redirected to the scale group Internet-facing servers 210 in the identified scale group 202A-202N for processing.

Figure 2B:
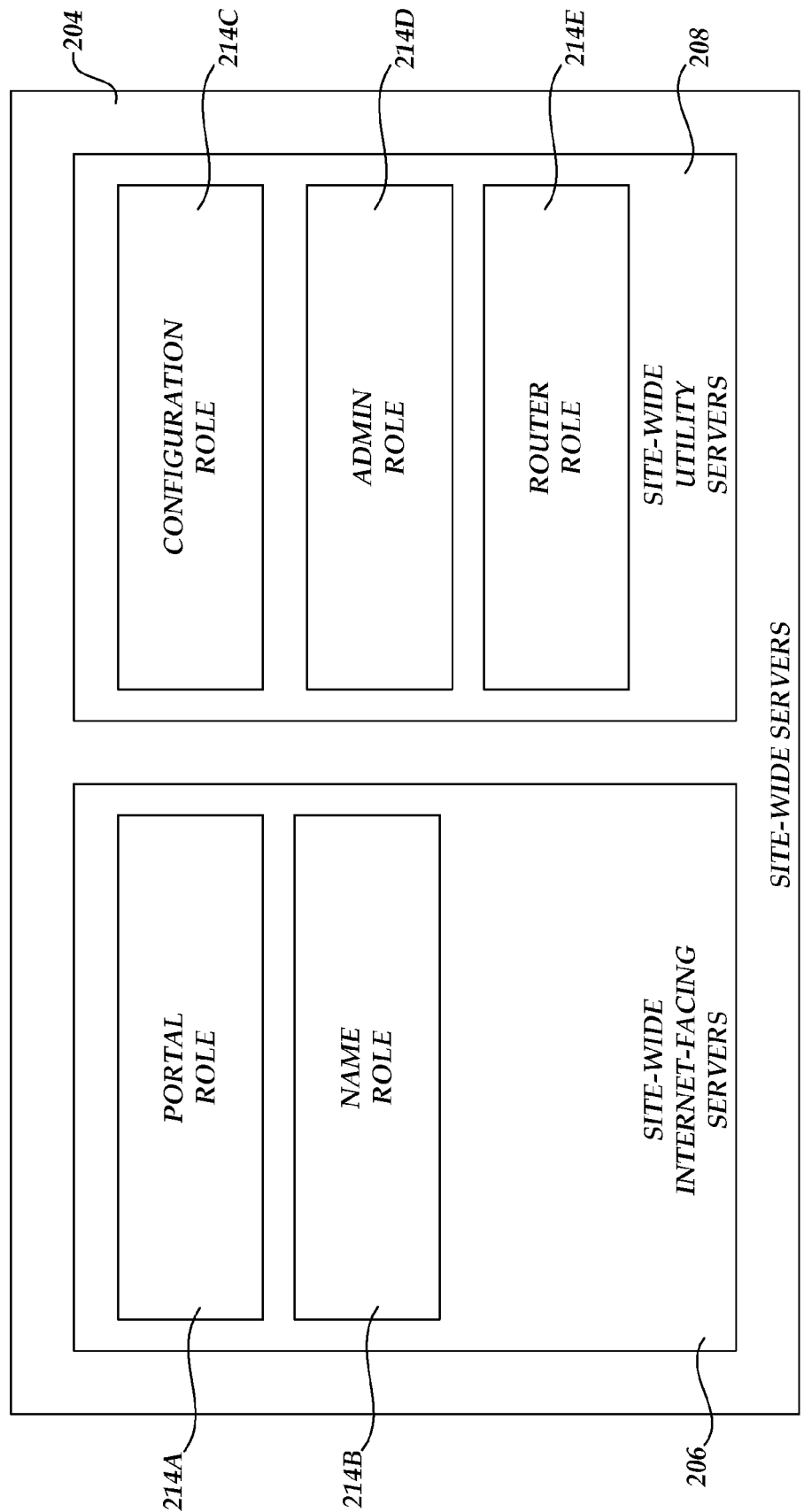

Turning now to FIG. 2B, additional details will be provided regarding the roles to which the site-wide server computers may be assigned. As shown in FIG. 2B, the site-wide Internet-facing servers 206 may be assigned to a portal role 214A and/or to a name role 214B. Server computers assigned to the portal role 214A are configured to provide the user interfaces (the "portal") for the system 100 that are not tenant specific. For example, server computers assigned to the portal role 214A may be configured to provide sign-up and sign-in Web pages. Server computers assigned to the name role 214B are configured to provide DNS services. For instance, server computers assigned to the name role 214B may be configured to provide network addresses corresponding to sub-domains unique to each tenant. The definition of where tenant address records should point to comes from the configuration role 214C, described below. It should be appreciated that the site-wide Internet-facing servers 206 may be assigned to one or more of the roles shown in FIG. 2B or to other roles not illustrated or described herein.

As also shown in FIG. 2B, the site-wide utility servers may be assigned to a configuration role 214C, an administration role 214D, and/or a router role 214E. Servers assigned to the configuration role 214C are responsible for exposing configuration information from the shared configuration database 122 to other roles. For instance, servers assigned to the configuration role 214C may expose data regarding the available scale groups 202, data regarding the mapping of tenants to scale groups 202, and the resource limits for the scale groups 202. Other information may also be exposed.

Servers assigned to the administration role 214D are configured for performing administrative tasks for manipulating the system 200. For example, a server assigned to the administration role 214D may be configured to execute commands to create scale groups, move tenants between scale groups, and to provision tenants for testing, support, or monitoring purposes. Servers assigned to the router role 214E are configured to redirect certain actions to an appropriate scale group 202. For instance, a server assigned to the router role 214E may be configured to route a job to provision a new tenant, upgrade the data for a tenant, or to delete a tenant from the appropriate scale group 202. Other types of actions may be routed in a similar manner. It should be appreciated that the site-wide utility servers 208 may be assigned to one or more of the roles shown in FIG. 2B or to other roles not illustrated or described herein.

Figure 2C:
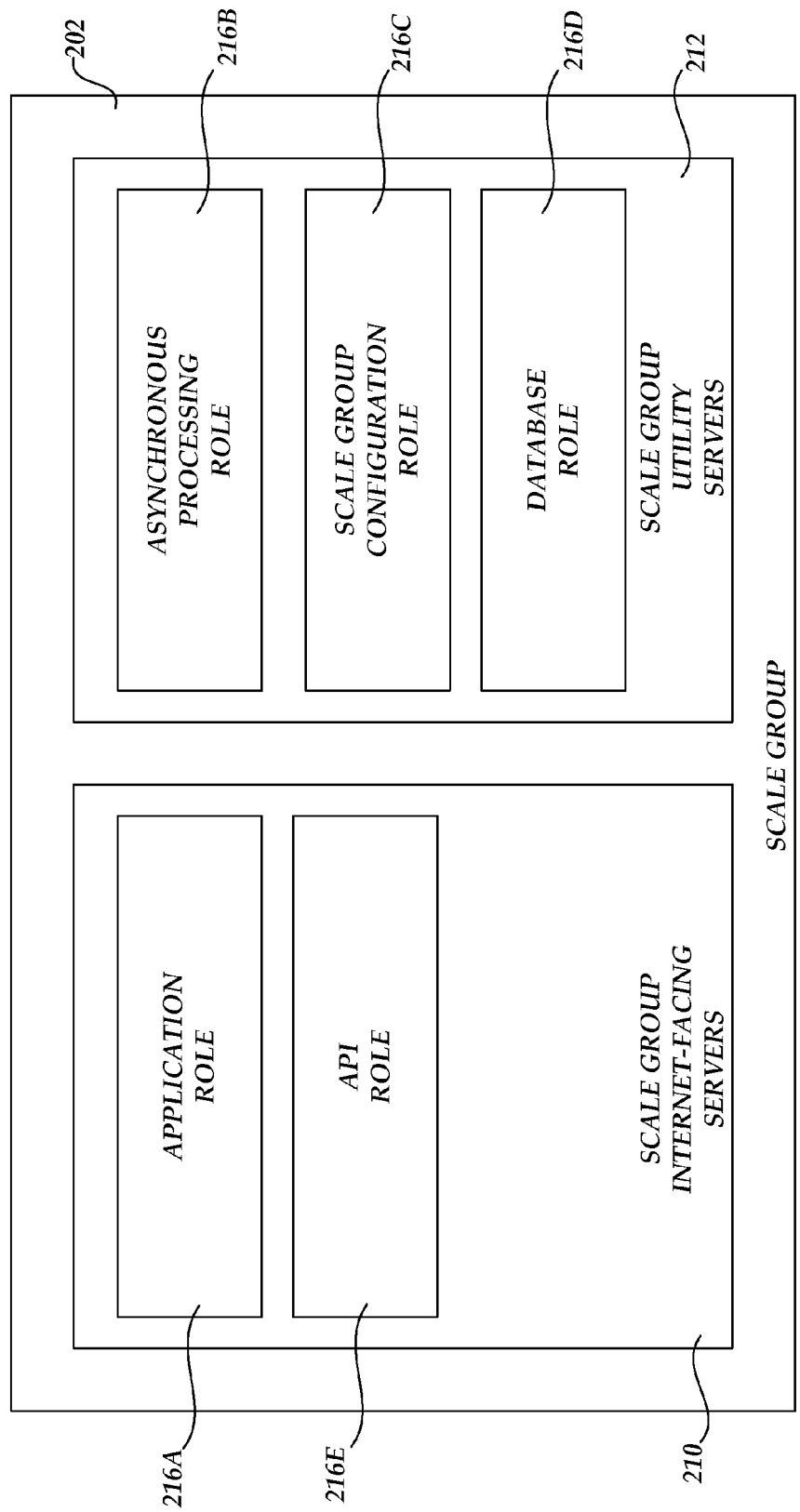

Referring now to FIG. 2C, additional details will be provided regarding the roles to which the server computers in each of the scale groups 202 may be assigned. As shown in FIG. 2C, the scale group Internet-facing servers 210 are assigned to the application role 216A. Servers assigned to this role are responsible for providing the actual application 106 that is used by the tenants. Servers assigned to the application role 216A may also be configured to assign long-running tasks to a server computer assigned to an asynchronous processing role 216B, described below. Server computers may also be assigned to an application programming interface ("API") role 216E. The API role 216E allows its consumers to execute remote procedures through Web service APIs, thereby enabling rich clients and other integration applications to access features provided by the system 200.

As also shown in FIG. 2C, the scale group utility servers 212 may be assigned to an asynchronous processing role 216B, the scale group configuration role 216C, and/or the database role 216D. Servers assigned to the asynchronous processing role 216B are configured to off-load long running operations from the application role 216A. Some examples include provisioning a new tenant, upgrading tenant data, deleting a tenant, bulk data import to a tenant, and bulk data extraction. Servers assigned to the scale group configuration role 216C are responsible for maintaining configuration settings for the scale group. Examples include data identified the servers that have been assigned to a scale group and data identifying the physical server that a tenant's data resides on. Server computers assigned to the database role 216D are configured to maintain the unshared organization databases 120. It should be appreciated that the scale group Internet-facing servers 210 and the scale group utility servers 212 may be assigned to one or more of the roles shown in FIG. 2C or to other roles not illustrated or described herein.

It should be appreciated that, in one embodiment, each of the roles described above may be assigned to two or more computing systems. By assigning each role to two or more computers, redundancy can be achieved. Additionally, this architecture permits zero down time patching of the operating system, the application program, or other dependent programs. The roles and architecture described above also allow the system 200 to address numerous problems associated with previous architectures for hosted multi-tenant applications. For instance, using the roles discussed above, tenants can be provisioned on the system 200 by signing up through a server computer assigned to the portal role 214A. This triggers the router role 214E to decide on a target scale group 202 for the new tenant and to record this selection through the configuration role 214C and the scale group configuration role 216B. After this has been performed, the asynchronous processing role 216B will provision the tenant and initialize an unshared organization database 120 for the new tenant. Once the tenant has been provisioned, end users can sign on to the system 200 through the portal role 214A, where they will be redirected to the application role 216A at their assigned scale group 202 via the name role 214B.

The system 200 also permits the site-wide roles to be upgraded independently of any upgrade to the scale-group roles. In this regard, new site-wide facilities may be added that scale group roles will leverage, in which case the site-wide roles will be upgraded first and the scale group roles thereafter. It is possible, therefore, to operate the system 200 in this half-upgraded state indefinitely, while still permitting new tenants to be added. New scale groups would then generally be constructed with the new versions of the scale group roles. Provision requests that target the new scale groups 202 can take advantage of new functionality immediately. Tenants that require a data upgrade can be upgraded at any time during which they will experience an outage depending upon the nature of the upgrade. After the upgrade, the tenant can use the new functionality that required a data upgrade. Tenants also experience no service outage during system upgrades due to backward compatibility of newer versions of the software. Tenants will only experience an outage when their data is being upgraded to take advantage of new system features. Moreover, one tenant's outage does not affect any other tenant. It should be appreciated that a tenant may not experience an outage where data and code is upgraded that is not visible to the tenant. These types of upgrades can be accomplished completely online without any tenant downtime whatsoever.

Figure 3:
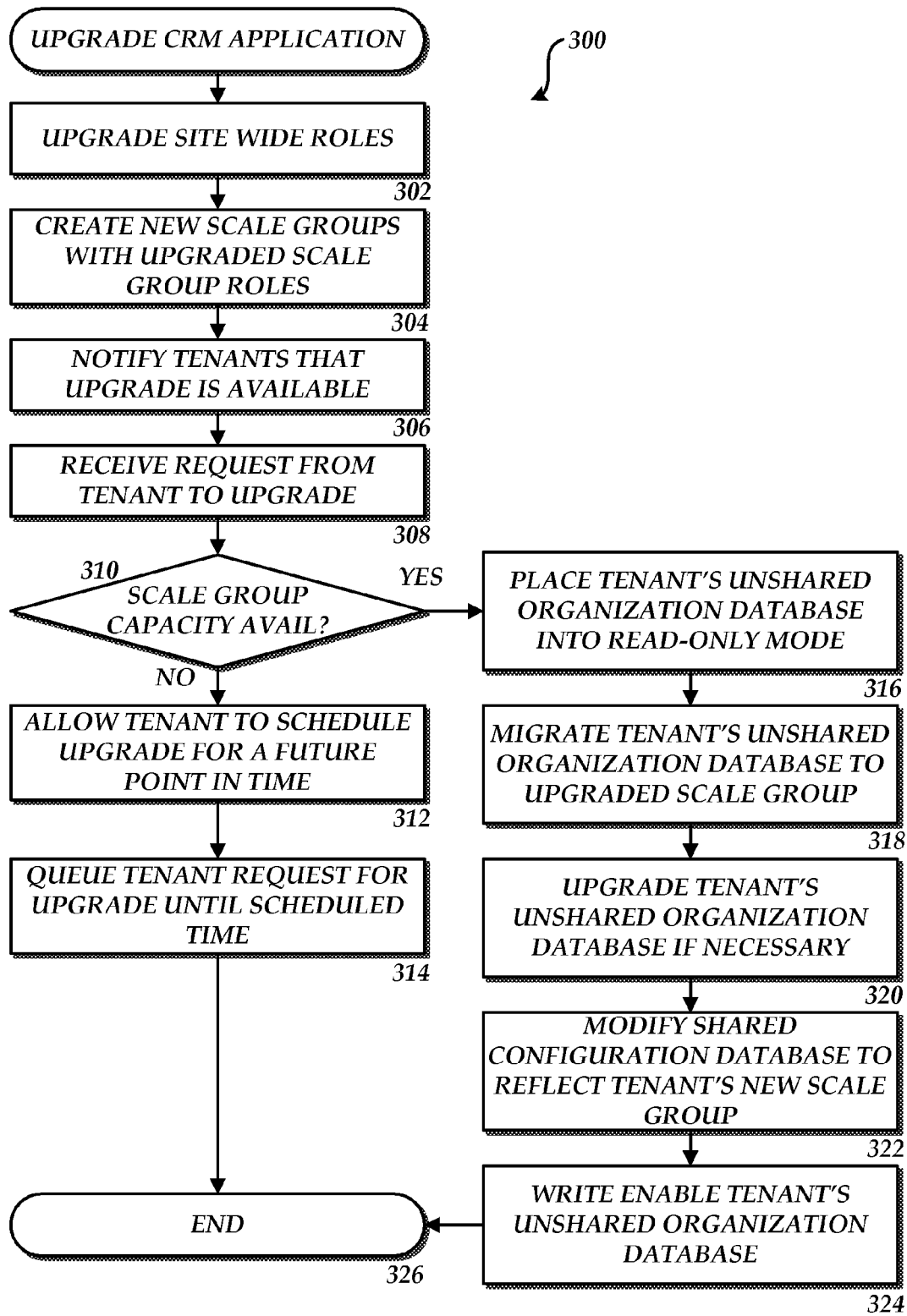
FIG. 3 is a flow diagram showing aspects of an illustrative routine for upgrading a multi-tenant hosted application in one embodiment presented herein.

Turning now to FIG. 3, additional details will be provided regarding the embodiments presented herein for enabling tenant management of various functions within a hosted multi-tenant application. In particular, FIG. 3 is a flow diagram showing a routine 300 that illustrates aspects of an illustrative process for permitting a tenant to manage the process of upgrading the CRM application 106 in the hosted multi-tenant system 200 in one implementation described herein.

It should be appreciated that the logical operations described herein with respect to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the FIGURES and described herein. These operations may also be performed in a different order than those described herein.

As discussed briefly above, the embodiments presented herein provide a mechanism by which a user of the hosted multi-tenant system 200 may upgrade the CRM application 106 according to a schedule or on-demand. The architecture of the hosted multi-tenant system 200 allows each of the tenants of the system to upgrade to a new version of the CRM application 106 at the time they desire to do so or upon a schedule of their choosing. In this manner, some tenants of the hosted multi-tenant system 200 may be utilizing a down level version of the CRM application 106 while other tenants may utilize an upgraded version. The routine 300 illustrates one mechanism for allowing a tenant of the hosted multi-tenant system 200 to upgrade the CRM application 106 and their tenant data on-demand.

The routine 300 begins at operation 302, where the site-wide roles 214A-214E executing on the site-wide server computers 204 are upgraded to a new version. Once the site-wide roles 214A-214E have been upgraded, the routine 300 proceeds to operation 304, where one or more new scale groups 202 are created having upgraded scale group roles 216A-216D. In this manner, the site-wide roles 214A-214E and new scale groups with upgraded scale group roles 216A-216D are created prior to upgrading any tenant's unshared organization database 120. Once the site-wide roles 214A-214E have been upgraded and one or more scale groups 202 with upgraded scale group roles 216A-216D have been created, the tenants of the hosted multi-tenant system 200 may be notified that an upgrade is available. This occurs at operation 306.

At operation 308, a request is received from a tenant of the hosted multi-tenant system 200 to upgrade to a newer version of the CRM application 106. In response to receiving such a request, the routine 300 proceeds to operation 310, where a determination is made as to whether capacity is available in the newly created scale groups having upgraded scale group roles 216A-216D. If no capacity is available on a scale group having upgraded scale group roles 216A-216D, the routine 300 proceeds from operation 310 to operation 312.

At operation 312, the tenant is permitted to schedule their upgrade for a future point in time when capacity becomes available on a scale group having upgraded scale roles 216A-216D. From operation 312, the routine 300 proceeds to operation 314, where the tenant's request to upgrade the CRM application 106 is queued until the scheduled time. When the scheduled time arrives, and if capacity is available at a scale group having upgraded scale group roles 216A-216D, the tenant's requested upgrade will be performed in the manner described below. From operation 314, the routine 300 proceeds to operation 326, where it ends.

If, at operation 310, it is determined that capacity is available at a scale group having upgraded scale roles 216A-216D, the routine 300 proceeds to operation 316. At operation 316, the tenant's unshared organization database 120 is placed into a read-only mode of operation. One mechanism for placing the tenant's unshared organization database 120 into read-only mode will be described below with reference to FIG. 5.

Once the unshared organization database 120 has been placed into read-only mode, the routine 300 proceeds from operation 316 to operation 318. At operation 318, the tenant's unshared organization database 120 is migrated to the scale group having the upgraded scale group roles 216A-216D. In this manner, a copy of the tenant's unshared organization database 120 is made at the new scale group. Once the copy has been created, the routine 300 proceeds to operation 320, where the contents of the tenant's unshared organization database 120 are upgraded, if necessary.

Once the unshared organization database 120 has been upgraded, the routine 300 proceeds to operation 322, where the contents of the shared configuration database 122 are modified to reflect the tenant's new scale group. In this manner, future requests from the tenant to utilize the CRM application 106 can be redirected to the proper scale group 202A-202N. Once the shared configuration database 122 has been updated, the routine 300 proceeds to operation 324 where the tenant's unshared organization database 120 is enabled for use at the new scale group. From operation 324, the routine 300 proceeds to operation 326, where it ends.

Figure 4A:
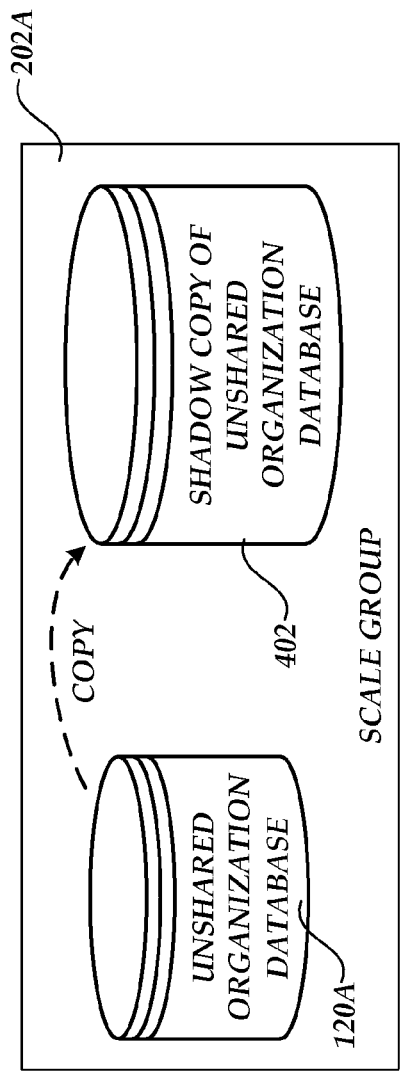
FIGS. 4A-4B are database diagrams showing aspects of one embodiment presented herein for creating a shadow copy of an unshared organization database according to one implementation disclosed herein.

Turning now to FIG. 4A, details of one embodiment presented herein for creating a shadow copy will be described. As discussed briefly above, a shadow copy is essentially a new tenant within the hosted multi-tenant system 200 that includes a copy of a tenant's unshared organization database 120. According to embodiments, the shadow copy operation copies the tenant's unshared organization database 120 to what is effectively a new tenant with all of the customer data carried over. This allows the tenant to utilize the shadow copy of their data separately from the master version of their unshared organization database. In this way, the tenant can test various modifications to the shadow copy rather than on their master version of their unshared organization database 120. For instance, as will be discussed in greater detail below, the tenant may upgrade the shadow copy of their unshared organization database 120 to an upgraded version of the CRM application 106. The tenant can then utilize their data with the upgraded version of the CRM application 106 without committing the master version of their unshared organization database 120 to the upgrade process. If the tenant desires to migrate to the updated version of the CRM application 106, the master version of the unshared organization database 120 may be upgraded and changes to the shadow copy of the unshared organization database 120 may be merged into the upgraded master unshared organization database 120. Additional details regarding this process will be provided below.

As shown in FIG. 4A, the process of creating a shadow copy may include copying a tenant's unshared organization database 120A to a shadow copy 402 of the unshared organization database 120A. In the example shown in FIG. 4A, the shadow copy has been created at the same scale group 202A. It should be appreciated, however, that the shadow copy 402 may be created at another scale group. In one embodiment, the shadow copy 402 of the unshared organization database 120A is accomplished through database backup and restore. According to embodiments, data is also recorded indicating that the shadow copy 402 was created from the "master" unshared organization database 120A. The shadow copy 402 is also provided a new name so that the tenant can log onto the shadow copy 402 uniquely.

Figure 4B:
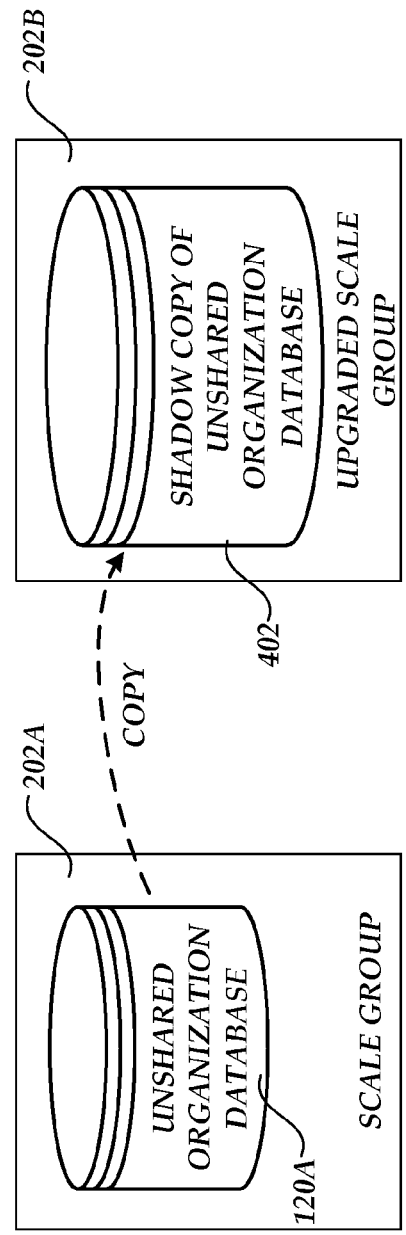

FIG. 4B shows another illustrative embodiment wherein a shadow copy 402 has been created at a scale group 202B that includes upgraded scale group roles 216A-216D. In this example, the unshared organization database 120A is copied from the scale group 202A to the scale group 202B. Once the shadow copy 402 has been created at the scale group 202B, the shadow copy 402 of the unshared organization database 120A is upgraded in the manner described above with reference to FIG. 3. In this manner, a tenant's data can be utilized with an upgraded scale group 202B in order to test the various features provided by the upgrade with the organization's data. Additional details regarding the process of creating a shadow copy 402 will be described below with reference to FIG. 4C.

Figure 4C:
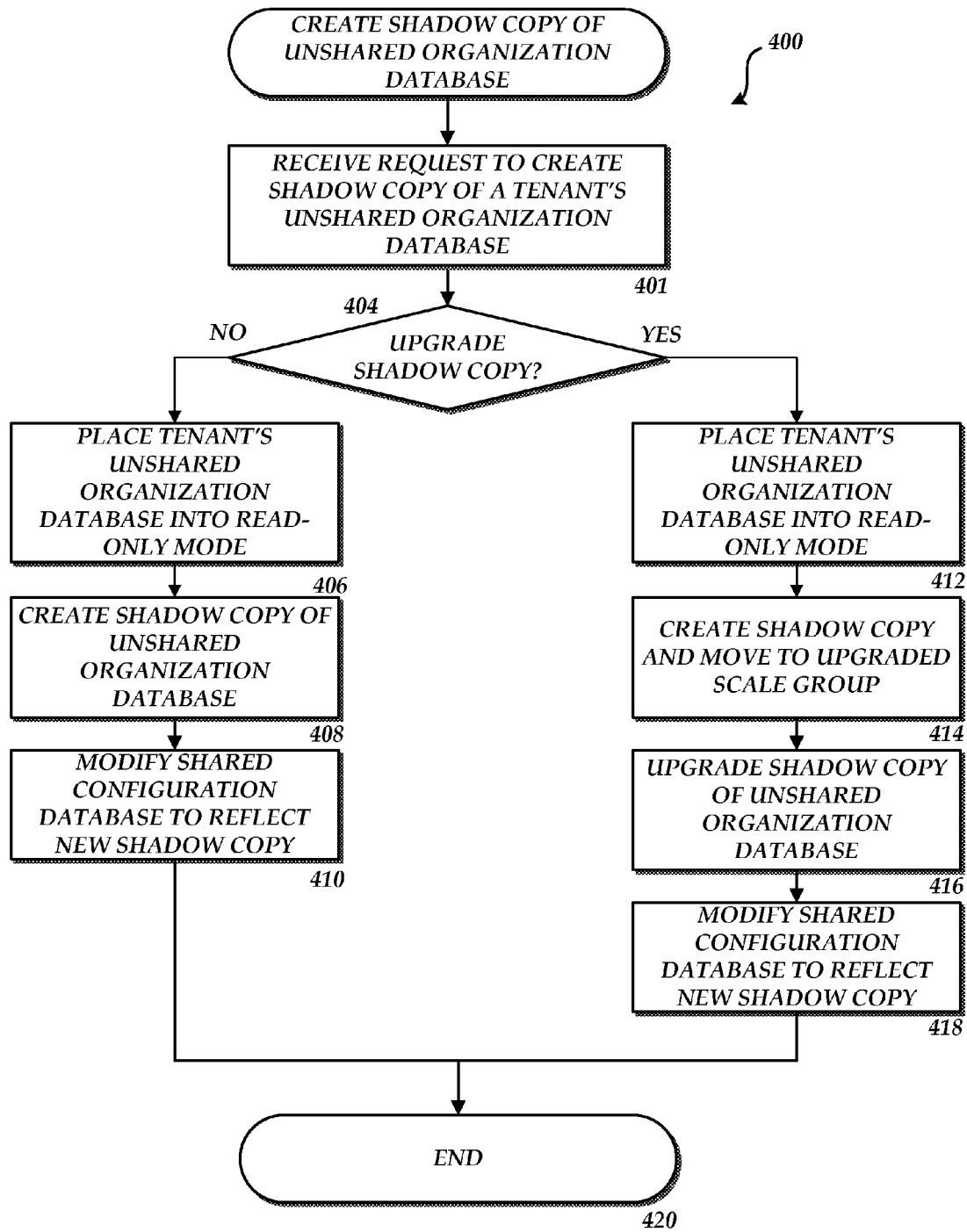
FIG. 4C is a flow diagram showing aspects of an illustrative routine for creating a shadow copy of an unshared organization database in one implementation.

FIG. 4C shows an illustrative routine 400 showing one process performed by the multi-tenant system 200 for creating a shadow copy of an unshared organization database 120. The routine 400 begins at operation 401, where a request is received from a tenant to create a shadow copy 402 of the tenant's unshared organization database 120. As part of the request, the tenant may indicate that the shadow copy 402 should be upgraded to a scale group 202B having upgraded scale group roles 216A-216D.

In response to receiving such a request, the routine 400 proceeds to operation 404, where a determination is made as to whether the tenant requested to upgrade the shadow copy 402. If the shadow copy is not to be upgraded, the routine 400 proceeds to operation 406, where the tenant's unshared organization database 120 is placed into a read-only mode of operation. As discussed above, a method for placing the unshared organization database into a read-only mode will be described below with respect to FIG. 5.

Once the tenant's unshared organization database 120 has been placed into read-only mode, the routine 400 proceeds from operation 406 to operation 408. At operation 408, the shadow copy 402 of the tenant's unshared organization database 120 is created at the same scale group 202A or at another scale group 202B. The scale group utilized for holding the shadow copy 402 may be based upon the available capacity at each of the scale groups.

Once the shadow copy 402 has been created, the routine 400 proceeds to operation 410, where the shared configuration database 122 is modified to reflect the new shadow copy 402. As discussed above, the shadow copy 402 may be given a distinct name so that the tenant can utilize the unshared organization database 120 and a shadow copy 402 concurrently. From operation 410, the routine 400 proceeds to operation 420, where it ends.

If, at operation 404, it is determined that the tenant has requested to upgrade the shadow copy 402 of the unshared organization database 120 at an upgraded scale group 202B, the routine 400 proceeds from operation 404 to operation 412. At operation 412, the unshared organization database 120 is placed into a read-only mode of operation. The routine 400 then proceeds to operation 414, where the shadow copy 402 is created and moved to the upgraded scale group 202B. The shadow copy 402 of the unshared organization database 120 is then upgraded at the upgraded scale group 202B for compatibility with the upgraded scale group roles 216A-216D. This occurs at operation 416. Once the shadow copy 402 has been upgraded, the routine 400 proceeds to operation 418, where the shared configuration database 122 is modified in the manner described above in order to reflect the new shadow copy 402 at the upgraded scale group 202B. From operation 418, the routine 400 proceeds to operation 420, where it ends.

Figure 5:
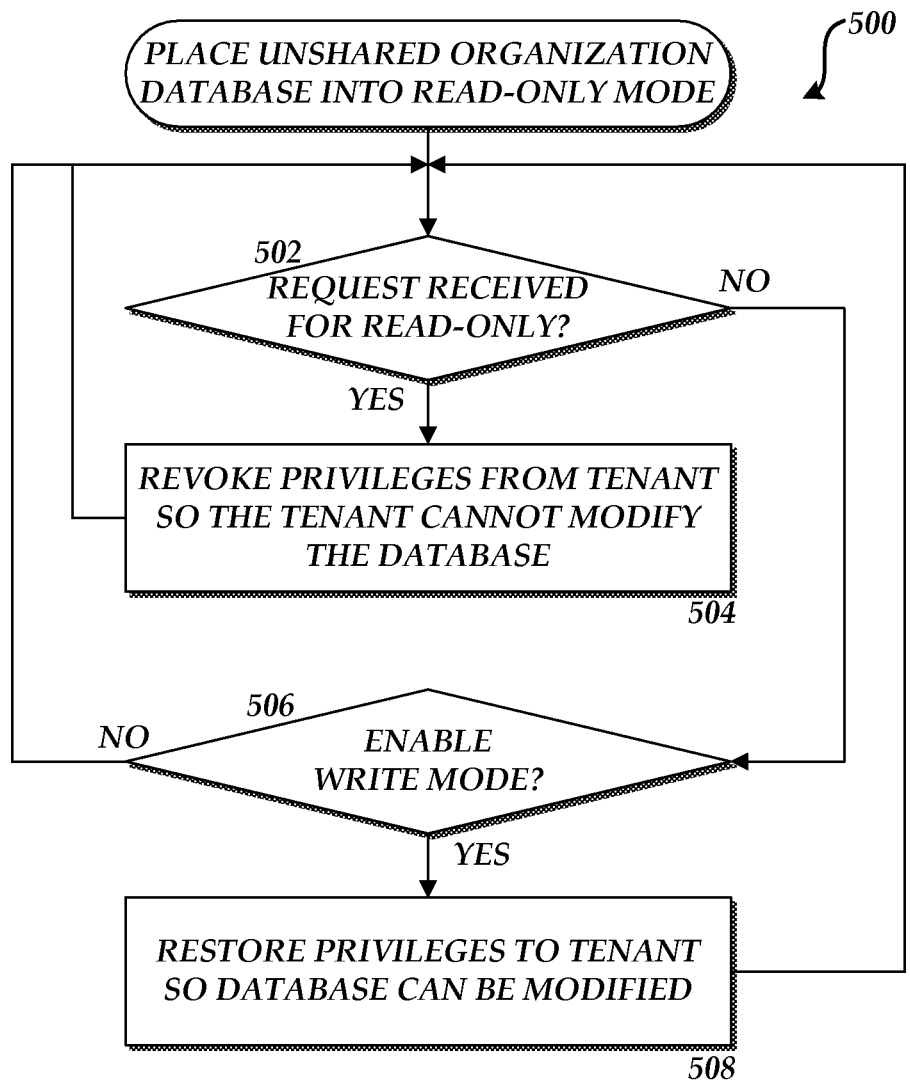
FIG. 5 is a flow diagram showing aspects of an illustrative routine for placing an unshared organization database into a read-only mode of operation in one embodiment presented herein.

Turning now to FIG. 5, an illustrative routine 500 will be described showing one embodiment presented herein for placing the unshared organization database 120 into a read-only mode of operation. The routine 500 begins at operation 502, where a determination is made as to whether a request has been received to place an unshared organization database 120 into a read-only mode of operation. If such a request has been received, the routine 500 proceeds from operation 502 to operation 504, where privileges are revoked from the tenant such that the tenant cannot modify the contents of the unshared organization database 120A. If a request is not received at operation 502 to place the unshared organization database 120 into a read-only mode of operation, the routine 500 proceeds from operation 502 to operation 506.

At operation 506 a determination is made as to whether a request has been received to enable write functionality on the unshared organization database 120. If so, the routine 500 proceeds from operation 506 to operation 508, where privileges are restored to the tenant so that the contents of the unshared organization database 120 can once again be modified. From operation 504 and 508, the routine 500 returns to operation 502 where the above process is repeated. It should be appreciated that the mechanism described in FIG. 5 for placing the unshared organization database 120 into a read-only mode of operation may also be applied to the shadow copy 402 of the unshared organization database. It should also be appreciated that the mechanism illustrated in FIG. 5 for placing the unshared organization database 120 into a read-only mode of operation is but one illustrative example and that other mechanisms may be utilized in the embodiments herein for making the unshared organization database 120 read-only.

According to embodiments, the hosted multi-tenant system 200 provides a suitable user interface through which the tenants may provide a request to place their unshared organization database 120 into the read-only mode of operation. Through this user interface, a tenant may manually place their system into a read-only state for any reason that they may have. A suitable interface may also be provided through which a tenant may return their unshared organization database to a write-enabled mode of operation.

Figure 6:
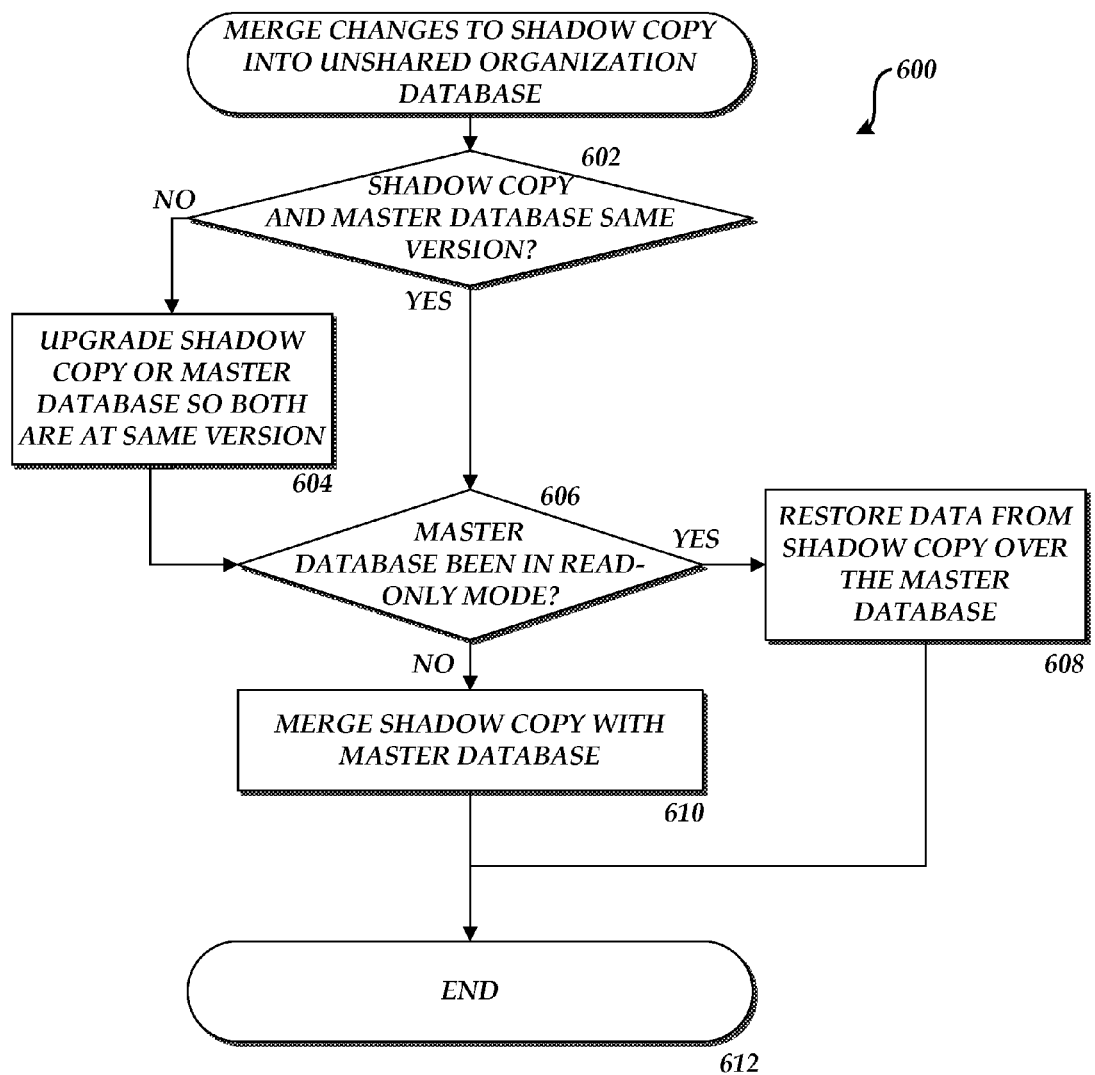
FIG. 6 is a flow diagram showing aspects of an illustrative routine for merging changes to a shadow copy of an unshared organization database into a master version of the unshared organization database according to one implementation presented herein.

As discussed briefly above, the hosted multi-tenant system 200 also provides functionality for merging changes to a shadow copy 402 back into the unshared organization database 120 from which it was created (referred to herein as the "master" database). FIG. 6 shows a routine 600 that illustrates one mechanism for merging changes to a shadow copy 402 back into the master database.

The routine 600 begins at operation 602, where a determination is made as to whether the shadow copy 402 and the master database are the same version. If not, the routine 600 proceeds from operation 602 to operation 604 where the master database is upgraded to the same version as the shadow copy 402. Alternately, it may be necessary to upgrade the shadow copy 402 if the master version was upgraded subsequent to the creation of the shadow copy 402. Once the shadow copy 402 and the master database have been upgraded so that both are at the same version, the routine 600 proceeds from operation 604 to operation 606.

If, at operation 602, it is determined that the shadow copy 402 and the master database are at the same version number, the routine 600 proceeds from operation 602 to operation 606. At operation 606, a determination is made as to whether the master database has been in the read-only mode of operation since the time the shadow copy 402 was created. If the master database has been maintained in the read-only mode of operation, the routine 600 proceeds from operation 606 to operation 608.

At operation 608, the shadow copy 402 is copied over the master database, thereby updating the contents of the master database to the contents of the shadow copy 402. If, however, at operation 606, it is determined that the master database has not been in read-only mode of operation since the creation of the shadow copy 402, the routine 600 proceeds from operation 606 to operation 610.

At operation 610, changes to the shadow copy 402 are merged with the contents of the master database. It should be appreciated that mechanisms exist for identifying changes between two data sets and for merging the identified changes. It should also be appreciated that a user interface may be necessary for allowing a tenant to identify conflicts between the shadow copy 402 and the master database. From operation 608 and 610, the routine 600 proceeds to operation 612, where it ends.

Figure 7:
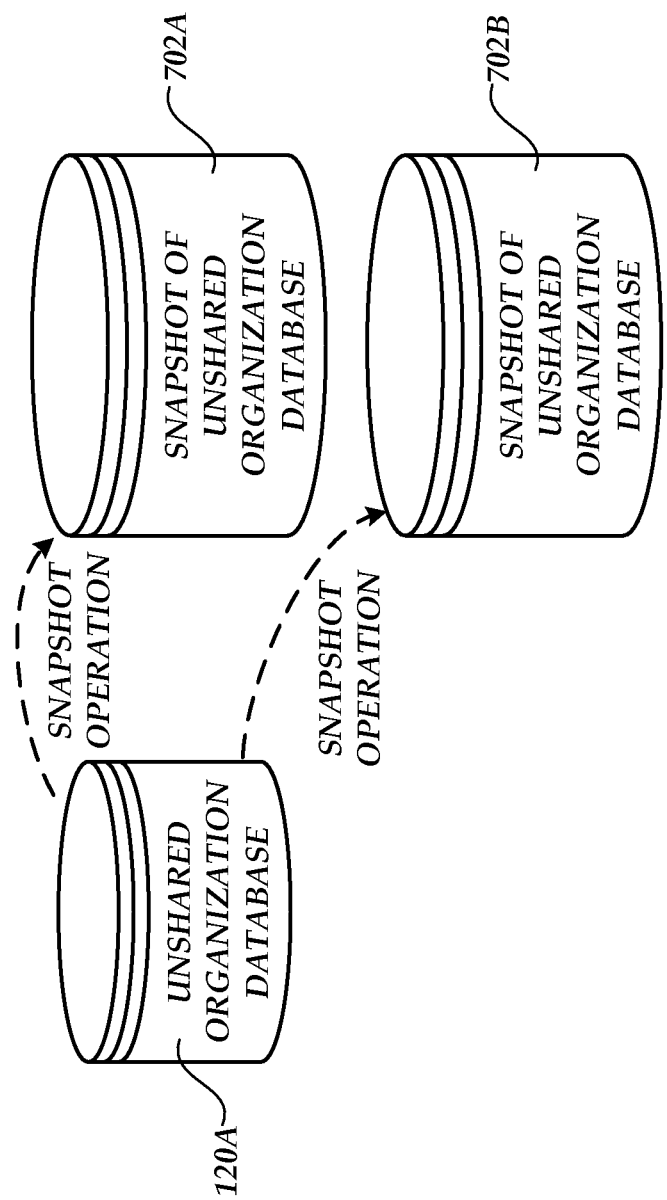
FIG. 7 is a database diagram showing aspects of one embodiment presented herein for creating a snapshot of an unshared organization database according to one implementation disclosed herein.

Referring now to FIG. 7, details will be provided regarding one embodiment presented herein wherein the hosted multi-tenant system 200 is further configured to allow a tenant to create one or more snapshots of their unshared organization database 120. In this regard, the database role 216D is configured in one embodiment for allowing a tenant to specify that snapshots should be taken of their unshared organization database 120A, for instance, at a particular time or according to a particular schedule. As known to those skilled in the art, database snapshots are a feature of some database management systems ("DBMSs") that allow a user to specify a point in time at which to preserve the contents of a database. Taking a snapshot of a database does not, however, actually make a copy of the database. Rather, a new database is created that is prepared to receive contents from the live database as the contents are replaced, changed, or overwritten. When a database snapshot is restored onto a database, the previous values are reapplied to the live database thereby bringing the database back to the state it was in at the point in time that the database snapshot was taken.

As shown in FIG. 7, a snapshot operation can be performed on the unshared organization database 120A to create a snapshot 702A of the database 120A at a particular point in time. A subsequent snapshot 702B may also be taken at a future point in time. Through an appropriate user interface, a tenant can specify that the snapshot 702A-702B be taken. Additionally, a tenant may also be permitted to specify that the unshared organization database 120A be reverted to one of the snapshots 702A-702B. Additional details regarding this process are provided below with respect to FIG. 8.

Figure 8:
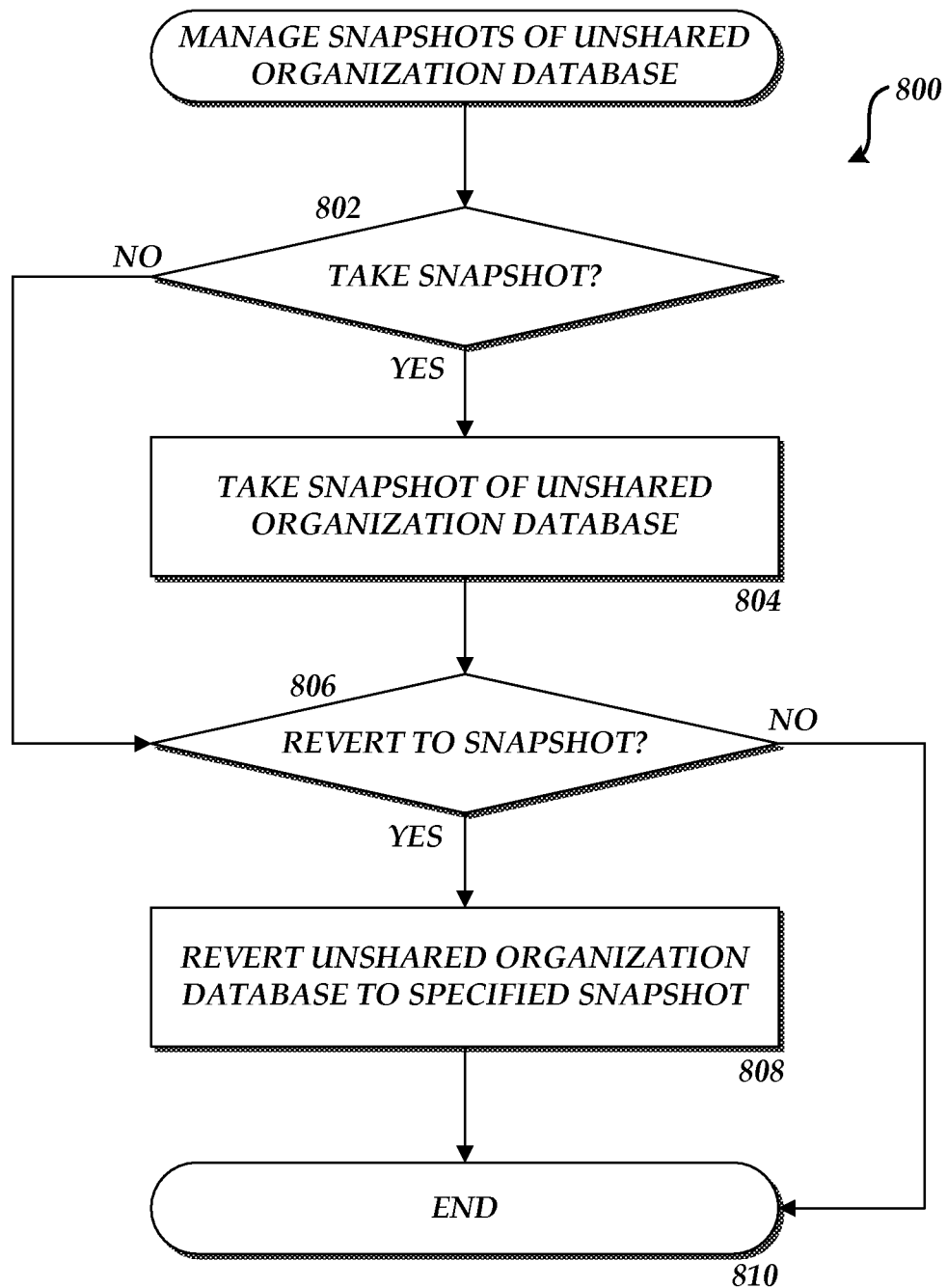
FIG. 8 is a flow diagram showing aspects of an illustrative routine for creating a snapshot of an unshared organization database and for reverting to a previously-created snapshot in one embodiment presented herein.

FIG. 8 illustrates a routine 800 for managing the snapshots 702A-702B of an unshared organization database 120 according to one embodiment presented herein. The routine 800 begins at operation 802, where a determination is made as to whether a request has been received from a tenant to take a snapshot of their unshared organization database 120. As discussed above, a suitable user interface may be provided through which a tenant may request to take or schedule snapshots of their unshared organization database 120. If a request has been received to take a snapshot of the unshared organization database 120, the routine 800 proceeds to operation 804 where the database role 216D causes a snapshot to be made of the unshared organization database 120. As discussed above, the actual functionality for taking a snapshot and for reverting to a snapshot may be provided by the underlining DBMS.

If, at operation 802, it is determined that a request to take a snapshot of the unshared organization database 120 has not been received, the routine 800 proceeds from operation 802 to operation 806. At operation 806, a determination is made as to whether a request has been received from a tenant to revert the unshared organization database 120 to a previous point in time utilizing one of the snapshots 702A-702B. If so, the routine 800 proceeds from operation 806 to operation 808, where the unshared organization database 120 is reverted to the previously taken snapshot 702A-702B specified by the tenant. As discussed briefly above, the underlying DBMS provides functionality for reverting to a previously taken snapshot 702. From operation 808, the routine 800 proceeds to operation 810, where it ends.

As discussed above, a tenant may be permitted to cause a snapshot to be created of their unshared organization database 120. As also discussed above, once the snapshot has been taken, the tenant may cause their unshared organization database 120 to be moved to an upgraded scale group 202B and upgraded in the manner described above. In one embodiment, the tenant may also be permitted to revert to a down-level version of the CRM application 112 by moving their unshared organization database 120 back to a down-level scale group 202A. In order to perform this operation, the snapshot of the unshared organization database 120 taken prior to the upgrade would be saved on the down-level scale group 202A for a period of time. The snapshot would then be utilized in response to a tenant request to revert to the down-level scale group 202A. It should be appreciated that in this scenario all changes made to the unshared organization database 120 after the creation of the snapshot would be lost. This operation may be desirable to a tenant in cases where the unshared organization database 120 is not compatible with other systems, where data is corrupt, or for other reasons deemed critical by the tenant.

Figure 9:
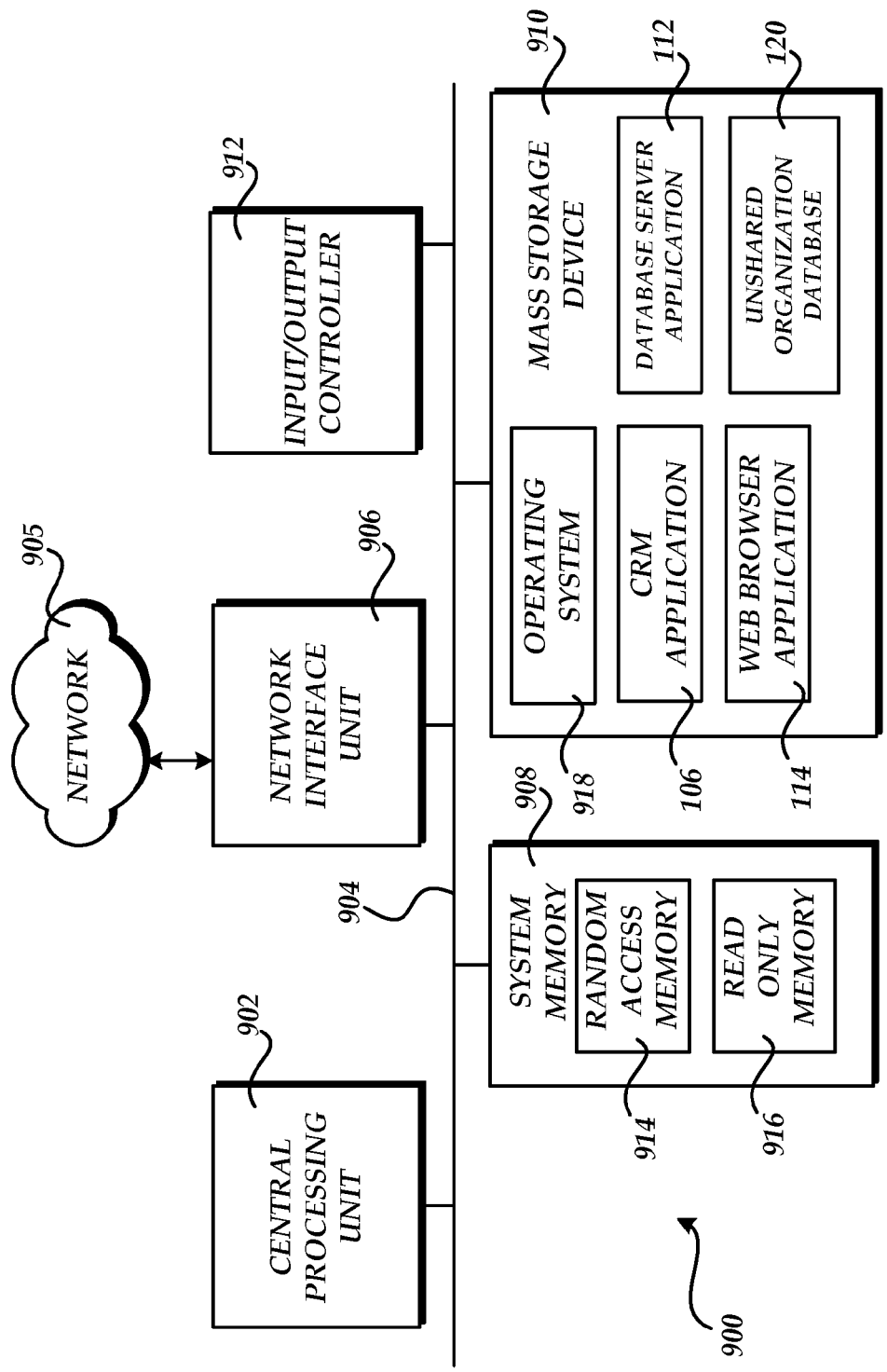
FIG. 9 is a computer architecture diagram showing an illustrative hardware architecture suitable for implementing the computing systems described with reference to FIGS. 1-8.

Referring now to FIG. 9, an illustrative computer architecture for a computer 900 capable of executing the software components described above with respect to FIGS. 1-8 will be discussed. The computer architecture shown in FIG. 9 illustrates a conventional desktop, laptop, or server computer and may be utilized to embody any of the computer systems described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 900, such as during startup, is stored in the ROM 916. The computer 900 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available computer storage media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network such as the network 905. The computer 900 may connect to the network 905 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system suitable for controlling the operation of a networked desktop, laptop, or server computer. The mass storage device 910 and RAM 914 may also store one or more program modules. In particular, the mass storage device 910 and the RAM 914 may store the CRM application 106, the Web browser application 114, the database server application 112, and the unshared organization database 120, each of which has been described above with reference to FIGS. 1-8. Other program modules and data files may also be stored in the mass storage device 910 and utilized by the computer 900.

Based on the foregoing, it should be appreciated that technologies for enabling customer management of a hosted multi-tenant application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system comprising:
   a database server application configured to maintain a shared configuration database and one or more unshared organization databases, the shared configuration database comprising site-wide data associating a plurality of tenants with one or more scale groups, and each unshared organization database storing private data associated with a particular tenant;
   a first scale group comprising a logical group of server computers having a first set of tenants from the plurality of tenants assigned thereto, the first scale group configured to store an unshared organization database for each of the first set of tenants assigned to the first scale group; and
   one or more site-wide server computers having site-wide roles assigned thereto for performing site-wide functions for the plurality of tenants, the site-wide functions comprising hosting an application for the plurality of tenants,
   the one or more site-wide server computers configured to upgrade the one or more site-wide roles to a new version, and create one or more new scale groups having upgraded scale group roles in response to upgrading the one or more site-wide roles,
   the one or more site-wide server computers further configured to receive a request from one of the first set of tenants to upgrade the hosted application and, in response to receiving the request,
      to place the one or more unshared organization databases for the one of the first set of tenants making the request into a read-only mode of operation,
      to migrate the one or more unshared organization databases for the one of the first set of tenants making the request to the one or more new scale groups,
      to cause the one or more unshared organization databases for the one of the first set of tenants making the request to be upgraded,
      to modify the shared configuration database to reflect an association between the one or more new scale groups with the one of the first set of tenants making the request, and
      to enable the upgraded one or more unshared organization databases for use by the one of the first set of tenants making the request at the one or more new scale groups.

2. The system of claim 1, wherein placing the one or more unshared organization databases into a read-only mode of operation comprises revoking one or more user privileges from the one of the first set of tenants making the request, such that the one of the first set of tenants making the request cannot modify the unshared organization databases.

3. The system of claim 1, wherein the one or more site-wide roles are upgraded prior to upgrading the one or more unshared organization databases.

4. The system of claim 1, wherein the scale group is further configured to receive a request from the one of the first set of tenants to create a shadow copy of the one or more unshared organization databases and, in response thereto, to cause a shadow copy of the one or more unshared organization databases to be created for use by the one of the first set of tenants.

5. The system of claim 4, wherein the shadow copy of the one or more unshared organization databases is created at the one or more new scale groups and wherein the one or more new scale groups are further configured to upgrade the shadow copy of the one or more unshared organization databases and to allow the tenant access to the unshared organization database in its pre-upgraded state.

6. The system of claim 5, wherein the first scale group is further configured to receive a request from one of the first set of tenants to merge changes to the shadow copy into the one or more unshared organization databases and, in response thereto, to cause changes to the shadow copy to be merged into the one or more unshared organization databases.

7. The system of claim 1, wherein the first scale group is further configured to receive a request from one of the first set of tenants to create a snapshot of the one or more unshared organization databases and, in response thereto, to cause a snapshot to be created of the one or more unshared organization databases.

8. The system of claim 7, wherein the first scale group is further configured to receive a request from one of the first set of tenants to revert the one or more unshared organization databases to a previously-created snapshot and, in response thereto, to cause the one or more unshared organization databases to be reverted to the previously-created snapshot.

9. One of an optical disk, a magnetic storage device or a solid state memory device having computer-executable instructions stored thereon which, when executed by a computer, will cause the computer to:
   maintain, at a database server application, a shared configuration database and one or more unshared organization databases, the shared configuration database comprising site-wide data associating a plurality of tenants with one or more scale groups, and each unshared organization database storing private data associated with a particular tenant;
   assign a first set of tenants from the plurality of tenants to a first scale group of a plurality of scale groups, each of the plurality of scale groups comprising a logical group of server computers storing an unshared organization database for each of the first set of tenants of the plurality of tenants assigned to the first scale group;
   assign site-wide roles to one or more site-wide server computers for performing site-wide functions for the plurality of tenants, the site-wide functions comprising hosting an application for the plurality of tenants;
   create one or more new scale groups having upgraded scale group roles; and
   receive a request from one of the first set of tenants of the hosted application to upgrade the hosted application and, in response to receiving the request,
      place the one or more unshared organization databases for the one of the first set of tenants making the request into a read-only mode of operation,
      migrate the one or more unshared organization databases for the one of the first set of tenants making the request to the one or more new scale groups,
      cause the one or more unshared organization databases for the one of the first set of tenants making the request to be upgraded,
      modify a shared configuration database to reflect an association between the one or more new scale groups with the one of the first set of tenants making the request, and enable the upgraded one or more unshared organization databases for use by the one of the first set of tenants at the one or more new scale groups.

10. The optical disk, magnetic storage device or solid state memory device of claim 9, wherein placing the one or more unshared organization databases into a read-only mode of operation comprises revoking one or more user privileges from the one of the first set of tenants, such that the one of the first set of tenants cannot modify the one or more unshared organization databases.

11. The optical disk, magnetic storage device or solid state memory device of claim 9, having further computer-executable instructions stored thereon which, when executed by the computer, will cause the computer to receive a request from the one of the first set of tenants to create a shadow copy of the one or more unshared organization databases and, in response thereto, to cause a shadow copy of the one or more unshared organization databases to be created for use by the one of the first set of tenants.

12. The optical disk, magnetic storage device or solid state memory device of claim 11, wherein the shadow copy of the one or more unshared organization databases is created at the one or more new scale groups and wherein the one or more new scale groups are further configured to upgrade the shadow copy of the one or more unshared organization databases.

13. The optical disk, magnetic storage device or solid state memory device of claim 12, having further computer-executable instructions stored thereon which, when executed by the computer, will cause the computer to receive a request from the one of the first set of tenants to merge changes to the shadow copy into the one or more unshared organization databases and, in response thereto, to cause changes to the shadow copy to be merged into the one or more unshared organization databases.

14. The optical disk, magnetic storage device or solid state memory device of claim 9, having further computer-executable instructions stored thereon which, when executed by the computer, will cause the computer to receive a request from the one of the first set of tenants to create a snapshot of the one or more unshared organization databases and, in response thereto, to cause a snapshot to be created of the one or more unshared organization databases.

15. The optical disk, magnetic storage device or solid state memory device of claim 14, having further computer-executable instructions stored thereon which, when executed by the computer, will cause the computer to receive a request from the one of the first set of tenants to revert the one or more unshared organization databases to a previously-created snapshot and, in response thereto, to cause the one or more unshared organization databases to be reverted to the previously-created snapshot.

16. A computer-implemented method for providing a hosted application to a plurality of tenants, the computer-implemented method comprising performing computer-implemented operations for:
maintaining, at a database server application, a shared configuration database and one or more unshared organization databases, the shared configuration database comprising site-wide data associating the plurality of tenants with one or more scale groups, and each unshared organization database storing private data associated with a particular tenant;
assigning a first set of tenants from of the plurality of tenants to a first scale group of a plurality of scale groups, each of the scale groups comprising a logical grouping of computers storing the one or more unshared organization databases for each of the first set of tenants of the plurality of tenants assigned to the first scale group of the plurality of scale groups;
upgrading one or more site-wide roles executing at one or more site-wide server computers, the site-wide roles for performing site-wide functions for the plurality of tenants, the site-wide functions comprising hosting an application for the plurality of tenants;
creating one or more new scale groups having upgraded scale group roles;
receiving a request from one of the first set of tenants of the plurality of tenants at one of the site-wide server computers to upgrade the hosted application for the tenant;
in response to receiving the request,
placing the one or more unshared organization databases for the one of the first set of tenants making the request into a read-only mode of operation by revoking one or more privileges from one or more scale group roles executing at the scale group storing the one or more unshared organization databases for the one of the first set of tenants making the request so that the scale group roles cannot modify the one or more unshared organization databases;
migrating the one or more unshared organization databases for the one of the first set of tenants making the request from the scale group storing the one or more unshared organization databases for the one of the first set of tenants making the request to the one or more new scale groups;
upgrading the one or more unshared organization databases at the one or more new scale groups;
modifying a shared configuration database to reflect an association between the one or more new scale groups with the one of the first set of tenants making the request; and
enabling the upgraded one or more unshared organization databases for use by the one of the first set of tenants making the request at the one or more new scale groups.

17. The computer-implemented method of claim 16, further comprising receiving a request from the one of the first set of tenants to create a shadow copy of the one or more unshared organization databases and, in response thereto, creating a shadow copy of the one or more unshared organization databases for use by the one of the first set of tenants.

18. The computer-implemented method of claim 17, further comprising receiving a request from the one of the first set of tenants to merge one or more changes to the shadow copy into the one or more unshared organization databases and, in response thereto, to merge the changes to the shadow copy into the one or more unshared organization databases.

19. The computer-implemented method of claim 18, further comprising:
receiving a request from the one of the first set of tenants to create a snapshot of the one or more unshared organization databases and, in response thereto, to cause a snapshot to be created of the one or more unshared organization databases; and
receiving a request from the one of the first set of tenants to revert the one or more unshared organization databases to a previously-created snapshot and, in response thereto, to cause the one or more unshared organization databases to be reverted to the previously-created snapshot.

* * * * *